United States Patent [19]

Hughes et al.

[11] Patent Number: 4,906,424
[45] Date of Patent: Mar. 6, 1990

[54] REACTION INJECTION MOLDING OF CERAMIC OR METALLIC GREENBODIES

[75] Inventors: O. Richard Hughes, Chatham; John R. Costanza, North Plainfield, both of N.J.

[73] Assignee: Hoechst Celanese Corp., Somerville, N.J.

[21] Appl. No.: 156,050

[22] Filed: Feb. 16, 1988

[51] Int. Cl.$^4$ .................. C04B 35/64; B29C 45/00; B22F 3/00
[52] U.S. Cl. .................... 264/63; 264/328.6; 264/328.18; 419/36; 419/37; 419/65
[58] Field of Search ............. 264/63, 109, 125, 328.2, 264/328.6, 328.18; 419/36, 37, 65

[56] References Cited

U.S. PATENT DOCUMENTS

| | | | |
|---|---|---|---|
| 2,422,809 | 6/1947 | Stupakoff et al. | 264/63 |
| 2,939,199 | 6/1960 | Strivens | 25/156 |
| 3,234,308 | 2/1966 | Herrman et al. | 264/63 |
| 3,882,210 | 5/1975 | Crossley et al. | 264/63 |
| 4,000,110 | 12/1976 | Saito et al. | 264/63 |
| 4,180,538 | 12/1979 | Morikawa et al. | 264/63 |
| 4,207,226 | 6/1980 | Strom | 264/63 |
| 4,233,256 | 11/1980 | Ohnsorg | 264/63 |
| 4,283,360 | 8/1981 | Henmi et al. | 264/63 |
| 4,587,068 | 5/1986 | Borase et al. | 264/63 |
| 4,624,812 | 11/1986 | Farrow et al. | 264/63 |
| 4,627,945 | 12/1986 | Winkelbauer et al. | 264/29.5 |
| 4,708,838 | 11/1987 | Bandyopadhyay et al. | 264/63 |
| 4,721,599 | 1/1988 | Nakamura | 419/36 |
| 4,765,950 | 8/1988 | Johnson | 419/2 |
| 4,767,479 | 8/1988 | Ferguson et al. | 156/89 |
| 4,783,297 | 11/1988 | Ito et al. | 264/63 |

OTHER PUBLICATIONS

Willermet et al "Development and Processing of Injection-Moldable Reaction-Sintered SiC Compositions" Cer. Bull, vol. 57, No. 8 (1978).
IEEE 1984 Ultrasonics Symposium, Nov. 14–16, 1987, vol., 1, pp. 501–506.
Bell Laboratories Record, Apr. 1983, pp. 11–13.
"Injection Molding of Ceramic Insulating Materials", M. A. Strivens, American Society Bulletin, 42, (1963), pp. 13–19.
International Journal of High Technology Ceramics, vol. 2, 1986, Elsevier Applied Science Publishers, pp. 1–31.
"Potential Use of Polymerizable Solvents and Dispersants for Tape Casting of Ceramics", Landham et al, American Ceramic Society Bulletin, 66, No. 10, 1987, pp. 1513–1516.

Primary Examiner—Jan H. Silbaugh
Assistant Examiner—Mary Lynn Fertig
Attorney, Agent, or Firm—Depaoli & O'Brien

[57] ABSTRACT

Greenbodies are produced by a RIM injection molding process wherein a homogeneous mixture of finely divided ceramic or metallic material and a polymerizable monomeric binder is injected into a mold and held at an elevated temperature for a sufficient time to polymerize the binder and form the greenbody. A preferred monomeric binder includes di- and tri-acrylate or -methacrylate esters of polyols. The low viscosity of the monomeric binder allows a loading of ceramic material of greater than 50 vol. % without adversely affecting the ability to injection mold the mixture.

60 Claims, No Drawings

REACTION INJECTION MOLDING OF CERAMIC OR METALLIC GREENBODIES

BACKGROUND OF THE INVENTION

The present invention is directed to a novel method of injection molding ceramic compositions into ceramic articles.

The ceramic materials are of critical importance for a number of high temperature, high performance applications. Recently, there has been substantial interest in the development of ceramic compositions for critical engine parts including reciprocating engines, gas turbine and rocket engines. These applications require a unique combination of properties such as high specific strength, high temperature mechanical property retention, low thermal and electrical conductivity, hardness and wear resistance, and chemical inertness. However, the inability to produce complex shapes of high dimensional accuracy and sufficient strength using an economical fabrication technique has prevented ceramic materials from fulfilling their potential in these critical high temperature, high performance applications.

Several processes have been used in an attempt to form ceramic bodies. Among such processes include pressing ceramic powder into a greenbody followed by sintering or by hot pressing and subsequently shaping or machining the sintered body to produce the finished product. Another technique is slip casting in which the ceramic particles are dispersed in water, the slurry placed in a mold and the water removed to form a greenbody. The pressing techniques have been found unsuitable to form ceramic articles of complex shapes and which must meet specific design specifications. The slip casting technique is time consuming and has not yielded greenbodies of sufficient strength. In view of the problems associated with the prior techniques, the injection molding process has been increasingly used to form ceramic articles. Injection molding is a process wherein a moldable composition is forced into a mold or die. The injection molding process facilitates a rapid and repeated forming of a plurality of articles having a consistency with close dimensional tolerance. The injection molding process minimizes the amount of shaping or machining that may be required to produce a finished article.

Thermoplastic injection molding is a widely practiced fabrication technique for forming solid plastic articles. The articles are formed by injecting a molten thermoplastic polymer into a mold that is held at a temperature below the freezing point of the polymer to freeze the polymer in the mold. Filled polymers, typically having 10 to 40 volume % filler, are also frequently injection molded with success. Injection molding of highly-filled (i.e., 40 to 87 volume % filler) is less common and more difficult due to the much higher viscosity of the highly filled thermoplastics.

Thermoplastic injection molding as above described has been adapted for use in forming dense ceramic shapes. The process involves forming a ceramic greenbody by injection molding a composite comprising ceramic powder dispersed within a thermoplastic polymer, burning out the polymer, and sintering the resulting porous greenbody to a dense ceramic part with the same shape. The thermoplastic acts as a fluidizing agent to distribute the injection pressure throughout the mold and as the material which holds the ceramic particles in the shape of the mold after the part is ejected. A typical ceramic powder/thermoplastic polymer composite has a very high content of the ceramic particles, typically from about 50 to about 87 volume % and a minimum of the binder material to the hold the particles together in desired shape. Besides the use of thermoplastic binders, it has been suggested to use thermosetting resins as the binder for the ceramic particles. The thermosetting resin is cured or cross-linked in the mold. For example, U.S. Pat. No. 4,627,945 is directed to injection molding refractory compositions utilizing thermosetting phenolic resins which are cured in the mold by the addition of a curing agent to the mix of ceramic and thermosetting binder.

Besides the major binder component which comprises the thermoplastic or thermosetting resin, other additives are typically included in the ceramic/plastic composite which is injection molded. Thus, a typical composite will also contain a minor binder component which is often a thermoplastic, wax or oil and is removed early in the binder removal cycle, plasticizers which increase the fluidity of the ceramic-binder mixture, and processing aids such as surfactants which improve the wetting characteristics between the plastic binder and ceramic during mixing to form the composite.

A summary of injection molding applied to the fabrication of molded ceramic bodies is provided in an article entitled "Review: Fabrication of Engineering Ceramics by Injection Molding. I. Materials Selection", M. J. Edirisinghe et al, *International Journal of High Technology Ceramics, Vol. II*, 1986, pp. 1–31.

Various difficulties have been encountered utilizing injection molding as a route to the formation of dense ceramic parts. Specifically, the highly-filled ceramic powder-polymer mixes which are needed to produce a dense ceramic article are also excessively viscous. Good flow during injection molding requires a mix viscosity of less than 1,000 Pa.s ($10^4$ poise) in the shear range of between 100–1,000 $Sec^{-1}$ usually encountered in the gates and mold. To confer this fluidity to the ceramic-binder mix, the art has found it necessary to reduce the ceramic powder filling level. At reduced ceramic powder filling levels, the mix has sufficient fluidity to be injection molded, but the greenbody has an excessive level of binder. Accordingly, the conversion to a dense ceramic is accompanied by larger dimensional changes and is prone to higher instances of defects. A highly viscous resin binder, on the other hand, makes it more difficult to uniformly disperse the ceramic powder therein to form a uniform ceramic powder-plastic composite. Related to this is the difficulty in monitoring or characterizing the state of dispersion of the ceramic particles in the resin binder. Nonuniformities within the composite can result in the formation of fractures in the ceramic greenbody and/or the finished ceramic article.

Another problem associated with injection molding ceramic greenbodies from ceramic-binder mixes which utilize thermoplastic binders is that the thermoplastic binder must be melted to achieve the minimum mix viscosity. Thus, injection molding ceramic-thermoplastic binder mixes involves heating the extrusion device which mixes the ceramic powder and binder and eventually injects same into a cooled mold. Mixing and dispersing the ceramic powder uniformly into the binder and injection of the mix into the mold constitutes the majority of the injection molding process and, thus, consumes the greatest amount of energy. Moreover, to clean the extrusion device requires a shut down of the device and the eventual cooling thereof. Upon cooling, any thermoplastic polymer which remains adhered to the walls and screw of the extruder solidifies. Elaborate means are necessary to scrape the polymer off the internal surfaces of the extrusion device.

To overcome the problems associated with the injection molding of plastic parts which are caused by the high viscosity of the polymers which are used, reaction injection molding (RIM) has been utilized. The molding of plastic parts by RIM is a recent development. Plastic RIM involves injecting a reactive, low viscosity, liquid monomer or combination of monomers into a mold and causing the liquid to solidify and take the shape of the mold by initiating the polymerization of the monomer liquid in the mold itself. The objective is to produce a plastic part in the shape of the mold that is strong and rigid enough to be ejected from the mold. As far as is known, it is not believed that reaction injection molding has been used in the production of ceramic greenbodies.

SUMMARY OF THE INVENTION

The present invention is directed to the application of RIM processing to the fabrication of ceramic greenbodies. Thus, it has been discovered that RIM processing useful in forming plastic parts is also applicable to the formation of shaped ceramic greenbodies and ceramic components.

The ceramic RIM processing of the present invention comprises injection molding a mix of ceramic powder and a polymerizable low viscosity monomer or mixtures of monomers. The ceramic-monomer mixes are formulated to be highly filled, i.e., greater than 50 vol. %, with ceramic powder, yet have adequate fluidity to be processed at ambient temperatures and readily injected into hot molds. Useful monomers are those which are liquid at room temperature and can be polymerized under conditions of time and/or elevated temperature of the mold to solidify the fluid composition therein. Once polymerization is sufficiently completed, and the greenbody solidified, the part is ejected from the mold and handled by subsequent optional post curing, binder removal, sintering and, if needed, machining to produce a dense ceramic part. The greenbody in the mold may have sufficient integrity to be readily ejected therefrom but, yet, be only partially cured. Accordingly, substantial reductions in molding cycle time and energy usage can be obtained by ejecting the partially cured greenbodies from the mold and heating the ejected greenbodies in bulk in a single post curing oven.

Monomers which are particularly useful in this invention and which are more specifically disclosed below are multifunctional acrylate monomers. Non-limiting examples of multifunctional acrylate monomers include the di-, tri-, and polyacrylate, or -methacrylate esters of polyols.

DETAILED DESCRIPTION OF THE INVENTION

The RIM mix of the present invention is achieved by dispersing ceramic powder into a polymerizable monomer or mixture of monomers. The ceramic powder will comprise at least about 50 to about 87 vol. % of the RIM mix. Ceramic powders with narrow particle size distributions can typically be loaded to levels of 55-65 vol. %. On the other hand, substantially higher loadings of ceramic powder can be achieved by specifically tailoring the particle size distribution of the ceramic powder. Thus, ceramic powder loadings of about 80-87 vol. % can be achieved and readily molded by using particles having a multimodal particle size distribution such that a sufficient quantity of small diameter particles are provided to fill the interstices left by a compact of larger particles. Ceramic loadings of less than about 45 vol. % do not produce a final sintered product of adequate density and should be avoided. Relatively easy moldability is achievable even at very high loadings of ceramic powder, in accordance with the present invention since the highly viscous resin binders used in the prior art injection molding processes are now substituted with low viscosity polymerizable monomers or mixtures thereof. The viscosities of the prior art resin binder are always higher than the viscosity of the monomeric system of this invention. Accordingly, the maximum loading levels described above are not meant to limit the invention since it is now possible and desirable to utilize the highest ceramic loading levels to provide a dense ceramic product and still provide adequate flow during molding.

The ceramic powder of the RIM mix of the present invention is preferably utilized in finely divided form and will be comprised of particles having diameters in the range of from about 0.1 to 50 microns. The preferred ceramic powder has an average diameter of from about 0.10 to about 1 micron and may include larger whisker particles. The particular range of sizes of the ceramic powder, the size distribution whether unimodal, multimodal, or skewed, and particle shape, e.g., spheres, equiaxed platelets, cylindrical rods, fibers, are all factors which will effect the degree of loading of the ceramic powder into the ceramic powder-binder mix. The effect each of these factors has on the ceramic loading level and the viscosity of the mix is presently under evaluation by the art. For example, see William I. Corbett, P. T. B. Schaffer, "Injection Molding of Advanced Ceramics", 19th *International SAMPE Technical Conference,* Oct. 13-15, 1987, pages 545-553. It is known that the ceramic powder should be selected such that close packing of the powder particles may be obtained. In particular, an important factor for particle packing is particle size distribution as briefly described above. To obtain optimum packing, specially fabricated particle size distributions must be used in which a population of relatively fine particles fills the interstices of a population of relatively course particles as described previously. The size relationships and population quantities of particles to obtain optimum packing density and maximum loadings is described by R. K. McGeary in "Mechanical Packing of Spherical Particles" in J.Am. Ceramic Soc., 44 (10), 513-22 (1961) for bi, tri and quaternary mixtures of spherical particles.

Any ceramic material which can be formed into finely divided particles can be used in the present invention. Those ceramic powders which appear to be the most widely used at present for injection molding include silica ($SiO_2$), silicon nitride ($Si_3N_4$), silicon carbide (SiC), lumina ($Al_2O_3$), zirconia ($ZrO_2$), silicon, ferrite and mixtures thereof. Ceramic solid solutions may also be molded in accordance with the present invention. Nonlimiting examples of ceramic solid solutions include yttria-stabilized zirconia, lead zirconate titanate, and other perovskites, cobalt-bonded tungsten carbide, etc. This list of ceramic materials is not an attempt to limit the invention and, thus, any and all ceramic materials which can be converted into powders may find use in the present invention.

Besides ceramic articles, the present invention is also applicable to the formation of sintered metal products. Thus, the RIM mixes of the present invention may include metallic powders and the binder component. Useful metallic powders will include free metals as well as metal alloys. Accordingly, any reference to ceramics in accordance with this invention is considered to suggest as well metallic powders and sintered metal articles. Ceramic and metallic powders are considered equivalent for the purposes of practicing the invention. The ceramic or metallic powder employed in the mix is selected according to the designated function of the molded articles as is known to those with skill in the art.

Along with the addition of the finely divided ceramic particles there can be added reinforcing filaments, commonly called whiskers, to the binder. Among the most useful are silicon carbide whiskers which are known to provide improved strength to ceramic and metallic matrices.

The binder component of the RIM mix includes the primary binder material as well as optional components including minor binder components such as oils, waxes, plasticizers and processing aids such as surfactants, lubricants, etc. As expressed in the aforementioned article in the *International Journal of High Technology Ceramics*, the primary binder component is the controlling factor in determining the general range of the final binder properties. This component of the binder confers fluidity upon the powder sufficient to complete filling of the mold cavity and wets the solid powders in order to aid dispersion and remove trapped gas. The major binder component should show stability under mixing and molding conditions, confer adequate strength to the body during the initial stage of binder removal and leave a low residue after the binder is burned out.

In accordance with the method of the present invention, the primary binder material used to form the injection moldable mix containing ceramic particles is a polymerizable monomer or mixture of monomers which is polymerized and solidified in the mold. The ceramic powder, therefore, in accordance with this invention is dispersed within the polymerizable monomeric binder which is of low molecular weight and substantially lower viscosity than previously used thermoplastic or thermosetting resin binders and the resultant mix injected into the mold. The low viscosity of the monomeric binder of this invention allows for the fabrication of ceramic greenbodies which are highly filled with ceramic powder without the prior difficulties found during the injection molding of highly filled resin binders.

The polymerization of the monomeric binder can be initiated in a variety of ways including thermally, radiatively and catalytically. The polymerizable monomers can be those containing any group which is polymerizable at the conditions typically used in injection molding including; epoxy, alkoxy, carboxy, hydroxy, nitrile, etc., and di- and multifunctional monomers including polyoxy, polycarboxy, polyol and polycyano. It is to be understood that the term polymerizable monomer or mixture of monomers includes polymerizable oligomers which in the mold will react with other polymerizable monomeric or oligomeric units to form the completed polymeric binder. Any catalysts, curing agents, polymerization initiators, etc. which are needed are added to the RIM mix prior to introducing the mix into the mold.

In selecting the polymerizable monomer, the vapor pressure of the monomer as well as the formed polymer should be taken into consideration. Thus, monomers with low vapor pressures at processing and molding temperatures are preferred since a highly volatile monomer may vaporize from the RIM mix during injection molding, forming bubbles during flow to the mold or in the mold itself and, thus, degrade the uniform dispersion of the ceramic powder in the binder and ultimately yield a ceramic greenbody of insufficient density. Preferred monomers will have vapor pressures of less than 0.001 torr at 25° C. and less than 0.5 torr at 100° C.

The preferred monomers for use in the present invention exist in the liquid state at room temperature. The ability to form the RIM mix at room temperature is advantageous for several reasons including reduced energy costs, ease of processing, and ease of cleanup.

The most useful monomers which can be used in the present invention are the multifunctional acrylate monomers. These monomers are characterized as the di- or tri-acrylate or -methacrylate esters of polyols which are polymerized and thus solidified in the mold. The multifunctional monomers are not to be strictly limited to the di- and tri-acrylates, as higher polyacrylate monomers can be used. The multifunctional acrylate monomers of the present invention are attractive for use in this invention due to their low viscosity particularly at room temperature at which the preferred monomers are liquids. Also, the multifunctional acrylates can be used in a one-package system, in which the ceramic or metallic material need only be dispersed in one polymerizable monomeric stream. In contrast, RIM processing, such as that which leads to polyurethanes, may involve adding ceramic or metallic material to each of the reactant polyol and isocyanate streams.

The di- and tri-esters can be formed from suitable polyols including alkane diols, such as those containing 3 to 10 carbon atoms; alkylene glycols, such as ethylene glycol and propylene glycol; polyalkylene glycols; triols including trimethylol propane, trimethylol alkoxy propane, glycerol, glyceryl alkoxy; and higher polyols including pentaerythritol. Table 1 sets out a non-limiting representative sample of the multifunctional acrylate monomers which can be employed in this invention and the viscosity of these representative useful monomers. Aromatic diols may also be useful including catechol, resorcinol, and hydroquinone, etc.

The multifunctional monomers can be diluted with monofunctional monomers to lower the viscosity of the multifunctional component, to lower the crosslink density in the molded part, or to lower the cost of the binder. The preferred diluent monomers are liquids with low viscosities and low vapor pressures at the temperatures of mixing, milling, and molding. Furthermore, the diluent monomers will copolymerize with specific multifunctional monomers under molding conditions. Specific diluent monomers include: octyl/decyl acrylate, butyl acrylate, 2-ethylhexyl acrylate, 2-phenoxyethyl acrylate, 2-(ethoxyethoxy)ethyl acrylate, isobornyl acrylate, caprolactone acrylate, isobutyl methacrylate, ethyl methacrylate, 2-hydroxyethyl acrylate, N-vinyl pyrrolidone.

It is preferable and convenient to initiate the polymerization of the multifunctional acrylate monomers thermally. In such instances, it is desirable to add to the RIM mix a thermally activatable polymerization initiator. Among the most useful polymerization initiators are peroxides. In addition, peroxydicarbonates, peroxyesters, peroxyketals, hydroperoxides and azonitriles may be utilized to initiate the polymerization. These will all be refered to as "peroxides" for simplicity. A number of peroxide compounds have been developed and are available from commercial sources for this purpose. Considerations for a desirable peroxide polymerization initiator will be safety, solubility, and storage stability and, importantly, the peroxide decomposition temperature. A peroxide initiator functions by decomposing at its decomposition temperature to form active free radical species which react with the acrylate or methacrylate groups of the multifunctional monomer to form polymerizable molecules. Peroxides that are thermally stable at ambient processing temperatures but which decompose quickly at mold temperatures are preferred. Useful measures of peroxide stability and temperature dependence of stability are the half-life temperature and the activation energy for decomposition, respectively.

Table II provides a list of non-limiting representative peroxide polymerization initiators that have half lives of at most about 1 minute at temperatures in the range of from 90° to 200° C., the typical range of mold temperatures. These initiators therefore can be used to initiate polymerization with cycle times from injection to complete solidification of several minutes at typical mold temperatures. It is also important to note that the peroxide polymerization initiators set forth in Table II have a half life at room temperature of from about 8 to over 166 hours. Thus, at ambient temperatures, the mix will retain its fluidity for conveniently long times. T,0170 T,0180

The binding agent may also be comprised of small amounts of from about 1.0 to about 10% by weight of known materials which serve an additional binding function. Such materials include low density polyethylene, atactic polypropylene, ethylene vinyl acetate and waxes such as Okerein 1865 Q (supplied by Astor Wax Corp). It will usually be desirable to limit the additions of these thermoplastic materials to levels at which the RIM mix retains fluidity. It may be desirable to warm the mix to enhance solubility of the additives in the monomer.

In addition to the ceramic powder and the binding agent, the ceramic composition of the present invention may further contain conventional amounts of wetting agents, plasticizers and other types of processing aids which are added to the composition to obtain a suitable rheological system for molding. Specifically, from about 0.5 to about 5.0% by weight of wetting agents or surfactants can promote the dispersion and deagglomeration of the ceramic powder in the binding agent during mixing and milling operations. Suitable dispersants or surfactants include oleic acid, stearic acid, etc. There is a great variety of commercially available surfactants that can be used to improve the dispersion of ceramic powders in aqueous or nonaqueous media. Dispersants intended for use with non-aqueous media are preferred for dispersing the ceramic powder in the multifunctional monomers. For example, oleic acid is suitable for use with oxide ceramic powders such as alumina. ICI Specialty Chemicals markets a family of "Hypermer" polymeric dispersants for dispersion of solid particles in non-aqueous systems. Dispersants are available which are optimized for metal oxides, hydroxides, carbonates, salts, metals, non-metallic inorganics, carbon, etc.

Plasticizers in an amount of from about 1.0 to about 10% by weight decrease the viscosity of the composite to promote mixing. Typical plasticizers include waxes, silicones, alkyl phthalates, polyalkylene (e.g., polyethylene) glycols and linear saturated polyesters. Mold release agents in an amount of from about 0.05 to about 1.0% by weight prevent adhesion to the mold wall thereby facilitating removal of the shaped article from the mold. Typical mold release agents include silicones and various phthalates and amides such as Acrawax C (a fatty acid amide).

It is important in forming the RIM mix to obtain a thoroughly homogenous mixture of the components. It is the use of the polymerizable monomeric binder of the present invention which provides for a greater ability to form a homogeneous mix than has been the case with the previously used resin binders, whether thermoplastic or thermosetting. The manner in which the components are mixed is not critically important as long as a homogenous mixture is obtained for the molding step. A slurry of the ceramic powder in the multifunctional monomer can be formed by adding the dry ceramic powder to a liquid mixture of a multifunctional monomer and optional ingredients such as dispersant, plasticizer, lubricant, wax and other miscible components. Due to the low viscosity of the monomeric binder, higher loadings of the ceramic powder are now possible than has been achieved using the prior thermoplastic or thermosetting binders. Thus, at the high powder loading levels desired, it is useful to conduct the mixing step in a mixer equipped to handle high torque loads. So-called "double planetary" mixers are commercially available that have this capability. It may also be necessary to mill the RIM slurry before molding to assure that the powder is adequately mixed, deagglomerated and dispersed to its fundamental particle form. Various mills are commercially available, including torque rheometers and 3-roll mills.

The molding step is accomplished by known injection molding techniques. Injection molding operations are usually carried out utilizing the transfer method or the direct injection method. In the transfer method, a hydraulic press is utilized to force the material from a heated storage chamber, by means of a plunger, through sprues or runners, into a mold. Molding pressure is based upon the area of the plunger in the storage chamber and usually requires at least about 2,500 psia to force the present mixture into a mold; more commonly, pressures ranging from about 4,500 to 9,000 psia are used. In the direct injection method, the mixture is forced directly into the mold by either a hydraulic press, through runners and gates, or by reciprocating screw equipment. Either method may be utilized.

The mixture to be molded is fed into the injection molding die with sufficient pressure to force the mixture to flow into all areas of the die. A mold temperature is maintained that will decompose the peroxide to initiate polymerization of the multifunctional monomer. Temperatures in the range of from about 50° C. to about 200° C. are generally useful. A pressure sufficient to flow the present mixtures into a mold is required. Pressures in the range of from about 4,500 to about 9,000 psi are usually sufficient.

The residence time in the mold can vary over a wide range, from minutes to hours, depending upon the temperature of the mold and the thermal stability of the peroxide and peroxide concentration. Generally, rapid mold cycle times are desired. Accordingly, mold temperatures are maintained so as to promote polymerization in minutes or fractions of minutes. The time and temperature of the mold in accordance with the reaction injection molding process of the present invention must be such that the monomeric binder is polymerized sufficiently to yield a strong rigid greenbody part.

In certain instances, the molded part has sufficient strength to be ejected from the mold before polymerization is complete. In such case the molding cycle time can be shortened by reducing time in the mold. The incompletely polymerized greenbodies can be ejected from the mold, collected and heated in mass in an oven to complete the polymerization, it necessary.

Using the preferred multifunctional monomers of this invention results in a substantial amount of cross linking as polymerization in the mold proceeds. The product greenbody, thus, is a thermoset composite with substantial strength and dimensional rigidity such that machining of the greenbody is possible.

Conversion of the molded greenbody to a dense ceramic is accomplished in two steps. In the first of the steps, the organic materials in the greenbody are removed by one or a combination of several steps, including pyrolysis, oxidation, extraction or sublimation. The removal of the organic materials must be done in a manner such that the molded shape is retained with minimal occurrence of shrinkage or other deformation. The result is a porous greenbody having the same shape as the molded greenbody.

A widely practiced binder removal process is binder-burnout. In this approach, the greenbody is heated in an oxygen-containing atmosphere to temperatures at which the polymeric components oxidize to small molecule fragments and diffuse out of the greenbody. For most organics this process is complete at temperatures below about 700° C. The rate at which the temperature is raised must usually be carefully controlled and is slow, typically about 6° C. per hour, to prevent violent or rapid oxidation which can disrupt the homogeneity of the particle packing. The burnout time will also depend upon the size and volume of the molded article and is best extended to ensure that no blistering, slumping, or cracking occur in the article.

After the organic binder materials have burnt out, the molded article is next sintered to obtain the final product. The burnout and sintering steps may be carried out in a common furnace. However, because of the rather large difference in the temperature ranges of the two steps, they may be effectively carried out in separate furnaces. The sintering step is carried out by known sintering methods and techniques.

The sintering operation is preferably carried out in air, vacuum or inert gas environments such as nitrogen or argon. The sensitivity of the ceramic powder components to these environmental gases will determine which environment is used. For example, alumina compacts can be sintered in air but, alumina with SiC whiskers contained therein must be sintered in an inert gas environment to prevent oxidation of the SiC component. Sintering temperature is also dictated by the ceramic powder composition and powder particle size. Sintering temperatures for standard ceramic powders range from about 700-2200° C. Compacts formed with various small particles, e.g., less than 1 micron median particle size, will be effectively sintered at noticeably lower temperatures. The sintering time is usually between about 20 minutes and 5 hours.

Although the sintered product will have a smaller volume than the molded body, such shrinkage is accurately predictable. By utilizing the RIM processing technique of the present invention, highly loaded greenbodies can be ejected from the mold and when sintered, will yield a high density ceramic. If desired, the sintered body may be finished to even a higher degree of tolerance by machining, for example, by diamond grinding, electrochemical machining, ultrasonic machining, or by electrical discharge machining techniques, to produce tools or articles requiring extremely close tolerances.

The following example is illustrative and is not to be interpreted as limiting the present invention.

EXAMPLE 1

An RIM mix was formed with alumina for the purposes of producing a molded alumina article. The RIM mix included alumina powder, trimethylol propane trimethacrylate (TMPTMA), a dispersant and a polymerization initiator. The characteristics of the formulation are set forth in Table 1.

TABLE 1

| | Volume % | Batch volume (cc) | Batch weight (g) | Weight % |
|---|---|---|---|---|
| A. Alumina Powder (ALCOA A16S6) | 49 | 250 | 995 | 79.4 |
| B. TMPTMA (liquid) | 51 | 228 | 227 | 18.1 |
| C. Oleic Acid (liquid) (2 wt. % of A16SG) | 51 | 19.9 | 22 | 1.7 |
| D. Benzoyl peroxide (powder) (1 wt. % of TMPTMA) | 51 | — | 0.25 | 0.02 |
| E. 50/50 Toluene-/THF | 51 | 10 | 8 | 0.6 |
| | 100 | 510 | 1252 | 100 |

Components A, B and C were mixed in a one gallon stainless steel double planetary mixer at ambient temperature. The product had a thick paste consistency. The state of dispersion, as indicated by a "fineness of grind" measurement was improved by milling the paste on a Netzsch 3 roll mill. The resulting paste had a creamy consistency with a stable, low, shear thinning viscosity. The fineness of grind measurement indicated that there were no particles with a diameter greater than 5 microns.

The paste was evaluated on a Haake torque rheometer (Rheocord 40). The mixing torque at mixing speeds of 10 to 50 rpm was in the range of 80–120 meter grams at 35° C. This is a very low torque. Comparable loading of alumina in thermoplastic binders leads to a higher torque in the range of about 500–5,000 meter grams only at temperatures above the melt temperature of the thermoplastic.

The peroxide initiator was dissolved in the solvent and blended with a portion of the milled alumina/TMPTMA slurry to form a peroxide concentration of about 1 wt. % with respect to the TMPTMA content. Thus, 1.4 cc of a solution of benzoyl peroxide and 50/50 toluene/THF (0.18 g/cc) was stirred into 100 g of the slurry. The peroxide activated slurry also had a creamy consistency that was stable for long periods, at least several days at ambient temperature.

A sample of the peroxide-activated slurry was examined by differential scanning calorimetry (DSC) at a heating rate of 20° C./min. to detect the occurrence of polymerization by its exotherm and to characterize the temperature at which it occurs. An exotherm was evident beginning at 75° C., is complete by 175° C., and has a maximum at 115° C.

Portions of the peroxide-activated slurry were loaded into 2-piece steel bar molds with a cavity 13 mm wide ×6.14 mm thick ×5 inches long. The slurry-containing mold was fitted with a thermocouple and placed in an oven set at 120° C. The thermocouple indicated that the mold temperature rose to 100° C. within 20 minutes. At that temperature the mold was removed from the oven and quick cooled to ambient temperature in ice water. A greenbody bar was formed in the mold and had sufficient rigidity and strength to be lifted from the mold without damage.

The molded bars had an average bulk density of 1.8 g/cc. This is about 73% of the density that was expected (2.5 g/cc) and indicated that there were voids in the molded specimens. Samples of the greenbody bars were examined by TGA in air and nitrogen environments to characterize the thermostability and identify conditions for removing the binder by oxidation. A comparison of the weight loss of the greenbody as a function of temperature on heating at a rate of 20° C. per minute in air and nitrogen revealed that the removal of organic material is complete in each instance by the time the temperature reached 600° C. There were, however, mechanisms operating in the air environment that were not present in heating in the nitrogen environment. Thus in air, there was substantial weight losses occurring at 350°, 380°, 440° and 500° C., while in nitrogen, the predominant weight loss occurred at 455° C.

The organic components in the greenbody bars were removed by controlled oxidation in an oven with an air atmosphere. Temperature in the oven was raised from 30° to 600° C. at a rate of 6°/h and then cooled to ambient temperature. Each molded bar survived the binder -burn-out cycle in tact without evidence of cracks, sink marks or other dimensional distortions.

What is claimed is:

1. A RIM process for producing ceramic or metallic greenbodies comprising the steps of: forming a homogeneous RIM mix by dispersing finely divided ceramic or metallic material in a polymerizable monomeric binder comprising multifunctional acrylate or methacrylate esters, injecting said mix into a mold held at a temperature sufficient to polymerize said monomeric binder, maintaining said mix in said mold at said polymerization temperature for a time sufficient to polymerize and harden said binder to produce a molded product, and removing said molded product from said mold.

2. The process of claim 1 wherein said finely divided material comprises at least 50 vol. % of said homogeneous RIM mix.

3. The process of claim 1 wherein said finely divided material comprises at least about 60 vol. % of said homogeneous RIM mix.

4. The process of claim 1 wherein said finely divided material comprises at least about 80 vol. % of said homogeneous RIM mix.

5. The process of claim 1 wherein said homogeneous RIM mix is formed at room temperature.

6. The process of claim 1 wherein said homogeneous RIM mix is injected at room temperature into said mold.

7. The process of claim 1 wherein said mold is held at an elevated temperature to polymerize said monomeric binder.

8. The process of claim 7 wherein said mold is held at a temperature of from about 50° to 200° C.

9. The process of claim 1 wherein said homogeneous RIM mix is maintained in said mold for time sufficient to harden but only partially cure said binder, removing said partially cured molded product from said mold and completing curing of said binder outside of said mold.

10. The process of claim 1, wherein said finely divided material is a ceramic material.

11. The process of claim 10 wherein said ceramic material is selected from silica, silicon nitride, silicon carbide, alumina and zirconia, mixtures and solid solutions thereof.

12. The process of claim 10 wherein said ceramic material further includes ceramic whiskers.

13. The process of claim 12 wherein said ceramic whiskers are silicon carbide whiskers.

14. The process of claim 1 wherein said finely divided material is a metallic material.

15. The process of claim 14 wherein said metallic material comprises free metals or alloys thereof.

16. The process of claim 1 wherein said RIM mix further includes a thermally decomposable polymerization initiator.

17. The process of claim 16 wherein said polymerization initiator is a peroxide or combination of peroxides.

18. The process of claim 17 wherein said peroxide polymerization initiator has a half life of at most 1 minute at temperatures in the range of from 90° C. to 200° C.

19. The process of claim 17 wherein said peroxide polymerization initiator has a half life at room temperature of at least 8 hours.

20. The process of claim 1 wherein said esters are derived from diols selected from the group consisting of alkane diols containing 3 to 10 carbon atoms, alkylene glycols, polyalkylene glycols, aryl and alkyl/aryl diols.

21. The process of claim 1 wherein said esters are derived from triols selected from the group consisting of trimethylol propane, trimethylol alkoxy propane, glycerol and glyceryl alkoxy.

22. The process of claim 1 wherein said ester is derived from acrylic acid.

23. The process of claim 1 wherein said ester is derived from methacrylic acid.

24. The process of claim 1 wherein said monomeric binder is diluted with a monofunctional monomer.

25. The process of claim 24 wherein said monofunctional monomer comprises monofunctional acrylate or methacrylate alkyl esters.

26. The process of claim 1 further including removing polymerized binder from said molded product.

27. The process of claim 26 wherein said polymerized binder is removed by heating said molded article to volatilize said polymerized binder.

28. The process of claim 27 wherein said molded product is heated to a temperature of from about 450° to about 700° C. to volatilize said polymerized binder.

29. The process of claim 26 further including sintering the molded product subsequent to removal of said binder at a temperature of from about 1,000° to 2,200° C.

30. A ceramic RIM process for producing a sintered ceramic article comprising the steps of: forming a homogeneous mixture containing finely divided ceramic material and a polymerizable monomeric binder comprising multifunctional acrylates selected from the polyol esters of polyacrylate or polymethacrylate, injecting said homogeneous mixture into a mold, maintaining said mixture in said mold at a temperature and for a sufficient time to polymerize said monomeric binder and cause the hardening thereof to produce a molded product, removing said binder and subsequently sintering said product at a temperature of from 1,000° and 2,200° C. to produce a sintered product.

31. The process of claim 30 wherein said esters are derived from diols selected from the group consisting of alkane diols containing 3 to 10 carbon atoms, alkylene glycols and polyalkylene glycols.

32. The process of claim 30 wherein said esters are derived from triols selected from the group consisting of trimethylol propane, trimethylol alkoxy propane, glycerol and glyceryl alkoxy.

33. The process of claim 30 wherein said ester is derived from acrylic acid.

34. The process of claim 30 wherein said ester is derived from methacrylic acid.

35. The process of claim 30 wherein said polymerizable monomer is diluted with a monofunctional monomer.

36. The process of claim 35 wherein said monofunctional monomer comprises monofunctional acrylate or methacrylate alkyl esters.

37. A RIM process for producing ceramic or metallic greenbodies comprising the steps of: forming a homogeneous RIM mix by dispersing finely divided ceramic or metallic material in a polymerizable monomeric binder, injecting said mix into a mold held at a temperature sufficient to polymerize said monomeric binder, maintaining said mix in said mold at said polymerization temperature for a time sufficient to polymerize and harden said binder to produce a molded product, and removing said molded product from said mold.

38. The process of claim 37 wherein said finely divided material comprises at least 50 vol. % of said homogeneous RIM mix.

39. The process of claim 37 wherein said finely divided material comprises at least about 60 vol. % of said homogeneous RIM mix.

40. The process of claim 37 wherein said finely divided material comprises at least about 80 vol. % of said homogeneous RIM mix.

41. The process of claim 37 wherein said homogeneous RIM mix is formed at room temperature.

42. The process of claim 37 wherein said homogeneous RIM mix is injected at room temperature into said mold.

43. The process of claim 37 wherein said mold is held at an elevated temperature to polymerize said monomeric binder.

44. The process of claim 43 wherein said mold is held at a temperature of from about 50° to 200° C.

45. The process of claim 37 wherein said homogeneous RIM mix is maintained in said mold for time sufficient to harden but only partially cure said binder, removing said partially cured molded product from said mold and completing curing of said binder outside of said mold.

46. The process of claim 37, wherein said finely divided material is a ceramic material.

47. The process of claim 46 wherein said ceramic material is selected from silica, silicon nitride, silicon carbide, alumina and zirconia, mixtures and solid solutions thereof.

48. The process of claim 46 wherein said ceramic material further includes ceramic whiskers.

49. The process of claim 48 wherein said ceramic whiskers are silicon carbide whiskers.

50. The process of claim 37 wherein said finely divided material is a metallic material.

51. The process of claim 50 wherein said metallic material comprises free metals or alloys thereof.

52. The process of claim 43 wherein said RIM mix further includes a polymerization initiator which thermally decomposes at the mold temperature to initiate polymerization of said binder.

53. The process of claim 37 wherein said polymerizable monomeric binder comprises a mixture of distinct monomers capable of reacting with each other to form a polymer.

54. The process of claim 37 wherein said monomeric binder comprises an oligomer capable of reacting with other monomeric or oligomeric components in the binder to increase the chain length of said binder during polymerization.

55. The process of claim 37 wherein said RIM mix further includes a catalyst to increase the polymerization rate of said monomeric binder in the mold.

56. The process of claim 37 further including removing polymerized binder from said molded product.

57. The process of claim 56 wherein said polymerized binder is removed by heating said molded article to volatilize said polymerized binder.

58. The process of claim 57 wherein said molded product is heated to a temperature of from about 450° to about 700° C. to volatilize said polymerized binder.

59. The process of claim 56 further including sintering the molded product subsequent to removal of said binder at a temperature of from about 1,000° to 2,200° C.

60. The process of claim 47 wherein said ceramic material comprises alumina and further includes silicon carbide whiskers.

* * * * *